United States Patent [19]

Ruhter et al.

[11] Patent Number: 4,682,787
[45] Date of Patent: Jul. 28, 1987

[54] STEERING UNIT AND CONTROL LEVER CONSOLE FOR A VEHICLE

[75] Inventors: Martin L. Ruhter; Allan F. Loney, both of Dubuque, Iowa

[73] Assignee: Deere & Company, Moline, Ill.

[21] Appl. No.: 821,387

[22] Filed: Jan. 21, 1986

[51] Int. Cl.[4] .............................................. B62D 1/18
[52] U.S. Cl. ..................................... 280/775; 74/493; 180/334
[58] Field of Search ................ 180/315, 334; 280/775; 172/791, 793, 797; 74/493

[56] References Cited

U.S. PATENT DOCUMENTS

| | | | |
|---|---|---|---|
| Re. 31,646 | 8/1984 | Beals et al. | 280/775 |
| 2,424,523 | 7/1947 | Watter | 244/235 |
| 2,988,931 | 6/1961 | Markley, Jr. et al. | 74/556 |
| 3,032,134 | 5/1962 | Banker | 280/775 |
| 3,282,123 | 11/1966 | Klingaman | 74/479 |
| 3,533,302 | 10/1970 | Hansen | 180/78 |
| 3,628,396 | 12/1971 | Grobowski | 280/775 |
| 3,799,569 | 3/1974 | Baker | 280/775 |
| 4,033,158 | 7/1977 | Chamberlain et al. | 70/201 |
| 4,046,024 | 9/1977 | Broucksou | 74/493 |
| 4,195,535 | 4/1980 | Broucksou | 74/493 |
| 4,291,896 | 9/1981 | Koch | 280/775 |
| 4,392,670 | 7/1983 | Schultz | 280/775 |

FOREIGN PATENT DOCUMENTS 650870 10/1979 U.S.S.R. .............................. 74/493

Primary Examiner—Richard A. Bertsch
Attorney, Agent, or Firm—Henderson & Sturm

[57] ABSTRACT

A steering unit and control console for a vehicle comprising a pedestal assembly for supporting the vehicle steering unit and at least one vehicle control lever, a platform device secured to the vehicle and pivotally mounting the pedestal assembly in an upwardly position thereon for movement of the pedestal assembly about a transverse axis to adjust the position of the pedestal assembly, a locking unit pivotally mounted on the platform device for locking the pedestal assembly against the pivotal movement out of any one of a plurality of adjusted positions of the pedestal assembly, and a release unit for disengaging the locking unit whereby the pedestal assembly is pivotally movable to an adjusted position, the console including further the release unit having a handle which protrudes forwardly from the pedestal assembly and which is disposed below the steering unit, and further wherein the locking unit provides for a firm locked engagement of the locking mechanism to eliminate potential means of looseness.

11 Claims, 6 Drawing Figures

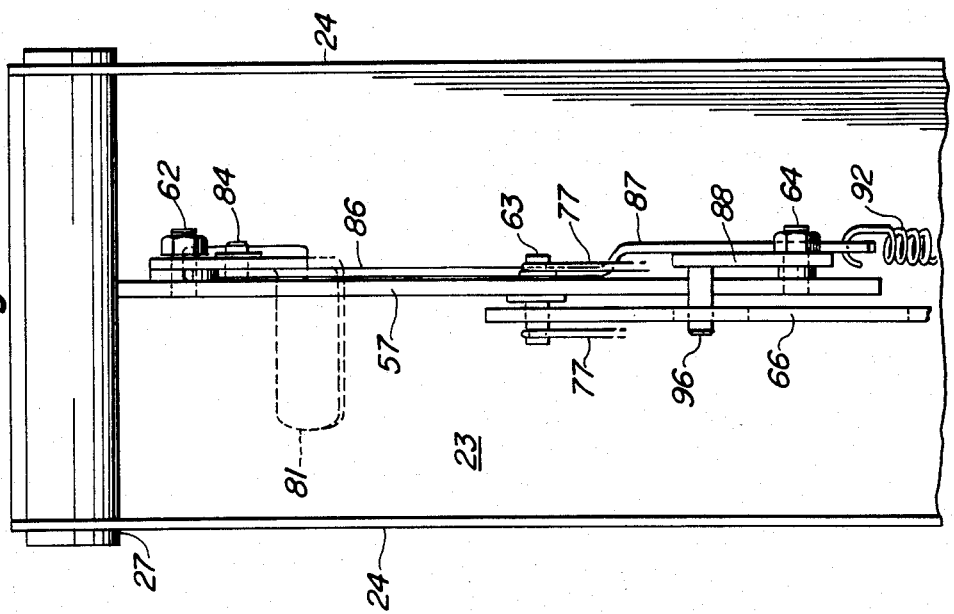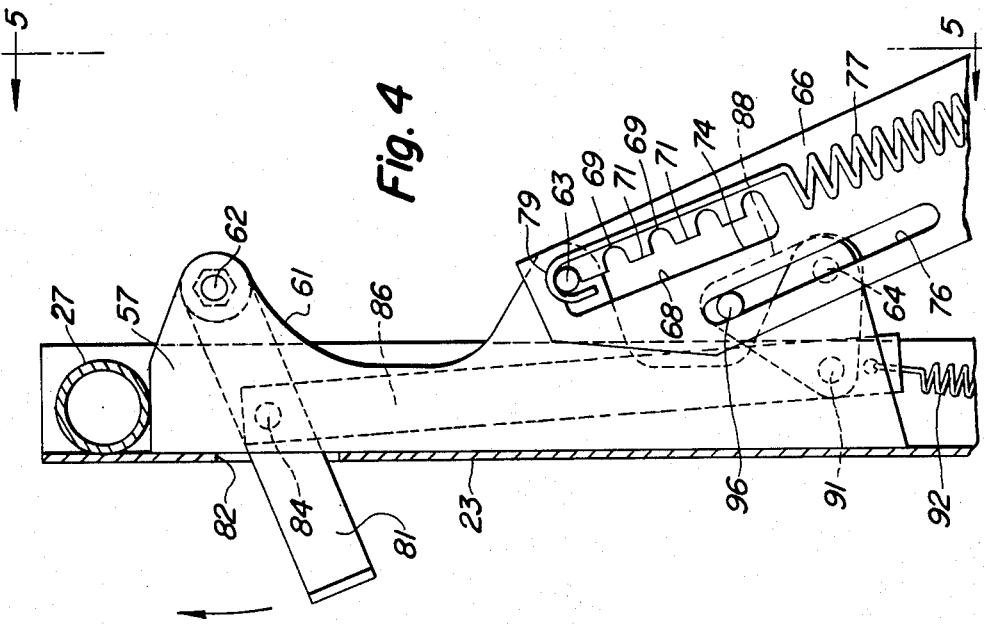

STEERING UNIT AND CONTROL LEVER CONSOLE FOR A VEHICLE

TECHNICAL FIELD

This invention relates to vehicle control consoles, and in particular to a vehicle console capable of being adjustably positioned in a plurality of locked positions.

BACKGROUND ART

This invention relates to an adjustable steering wheel and control lever console of a vehicle which is adjustable fore and aft angular orientation. In the operation of agricultural, construction and industrial machinery, such as, for example, motor grader vehicles, it is advantageous to provide adjustable positioning of the steering wheel and vehicle control levers relative to the operator for convenient access and manipulation. This is particularly true where the operator at times is not only sitting in one of several adjusted positions, but quite often is standing during operation of the vehicle.

Several techniques have been employed in the past to accomplish, for example, adjustability of the steering wheel alone relative to the operator. Such limited adjustment of the steering wheel, nevertheless, does not adequately provide for the needs of the operator during actual operating condition of road graders and the like. One attempt to overcome the lack of convenient adjustability of the vehicle control console is disclosed in U.S. Pat. No. 4,291,896 to Koch. Therein, an adjustable steering wheel and control lever console which is movable fore and aft of the operator is disclosed; however, the release means permitting the operator to release the console from a locked position for movement to a selected adjustable position involves a mechanism above the steering wheel and the console which obstructs visibility of the operator. Furthermore, arrangements such as that of Koch permits a looseness in the locking mechanism which is undesirable. Additionally, a means for anchoring the locking system is required separate from the console.

Those concerned with these and other problems recognize the need for an improved locking mechanism for a steering unit and control lever console which is movable fore and aft of the operator about a pivot axis to a desired locked position.

DISCLOSURE OF THE INVENTION

The present invention relates to a steering unit and control lever console for a vehicle which comprises a pedestal assembly for supporting the vehicle steering unit and one or more of a plurality of vehicle control levers for the various control functions of the vehicle; a platform device which pivotally mounts the pedestal assembly in an upward position on the vehicle for movement about a transverse axis to adjust the position of the pedestal assembly according to the need of the operator; a locking unit pivotally mounted on the platform device for locking the pedestal assembly against pivotal movement upon movement of the pedestal assembly to one of its adjusted positions; and a release unit capable of disengaging the locking unit whereby the pedestal assembly is pivotally movable to an adjusted position. Additionally, the means for locking the pedestal assembly against movement from a locked, adjusted position includes a counterbalance device mounted between the pedestal assembly and the platform device.

The present invention includes further the provision of a housing unit for the pedestal assembly which contains and confines therein the locking unit at all adjusted positions of the pedestal assembly such that at no time during the operation of the locking mechanism does any portion thereof protrude outwardly from the pedestal assembly. Furthermore, the locking unit includes a notched locking bar having notches formed therein, each of which cooperates with a locking pin part of the pedestal assembly, with the pin biased into engagement with a notch, the shape of each notch and the pin providing a firm, wedge fit, thereby eliminating all potential means of looseness.

An object of the present invention is the provision of an improved locking mechanism for a vehicle steering and control console.

Another object of this invention is to provide a locking system for a vehicle steering and control console, which locking system is operated by a release lever which does not obstruct operator visibility.

Still another object of this invention is to provide a counterbalance system for the movable console, which counterbalance system does not require separate anchoring means apart from the console assembly.

Yet another object of this invention is to provide a locking mechanism for a vehicle steering and control console which includes a locking unit contained and confined within the pedestal assembly of the console during all adjusted positions thereof.

A further object of this invention is the provision of a locking unit cooperable with the pedestal assembly to provide for a "wedge" fit of the locking unit when the pedestal assembly is in an adjusted position so as to eliminate looseness of the locking unit.

BRIEF DESCRIPTION OF THE DRAWINGS

These and other attributes of the invention will become more clear upon a thorough study of the following description of the Best Mode For Carrying Out The Invention, particularly when reviewed in conjunction with the drawings, wherein:

FIG. 4 is an enlarged side elevational view, partly in section, of portions of the pedestal assembly, locking unit and release unit of this invention;

FIG. 5 is a rear elevational view taken along line 5—5 in FIG. 4; and

BEST MODE FOR CARRYING OUT THE INVENTION

Figure 1:
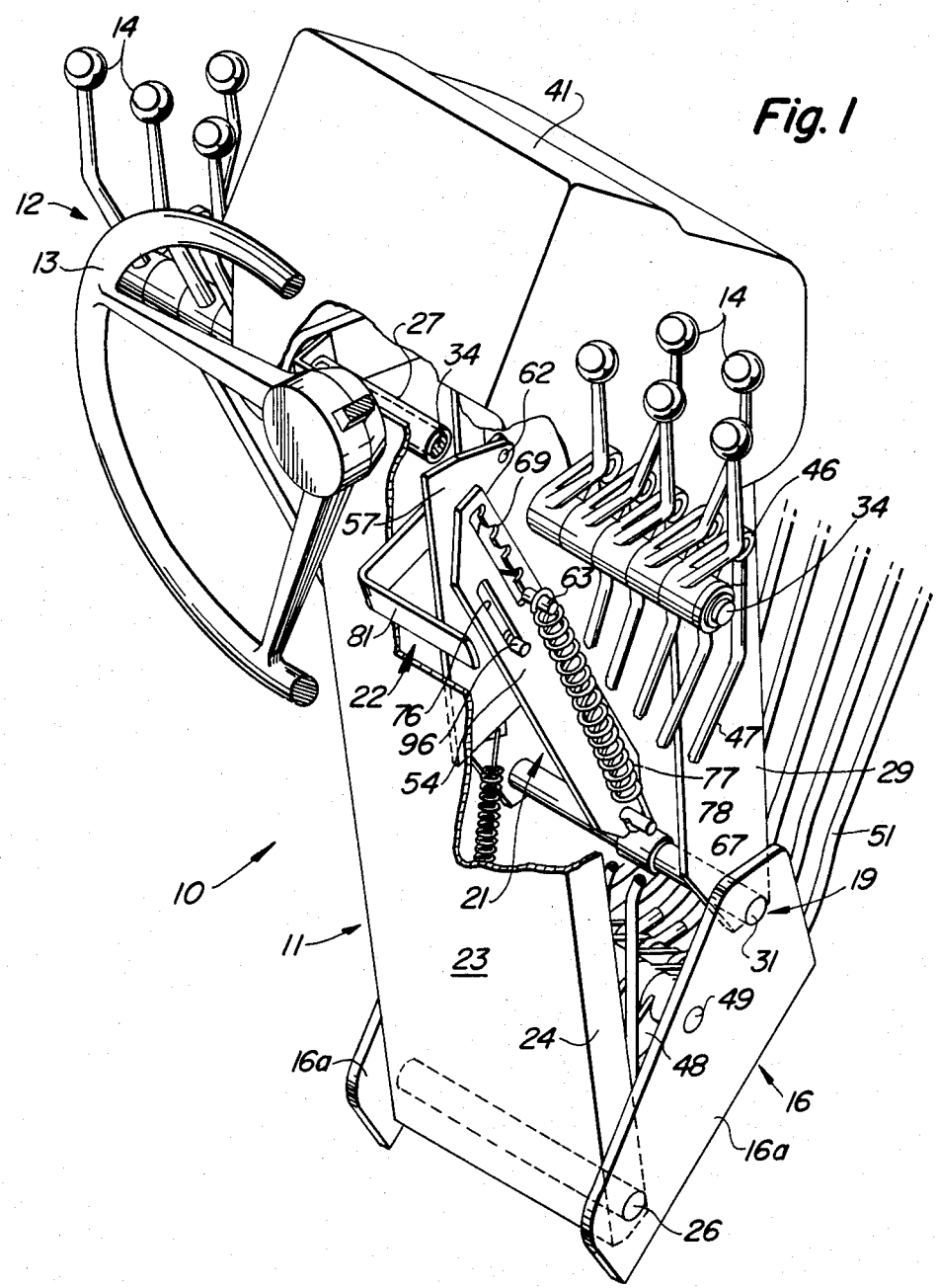
FIG. 1 is a front elevational perspective view, with certain parts broken away and others in section, of the locking mechanism for a vehicle steering and control console of the invention.
Figure 2:
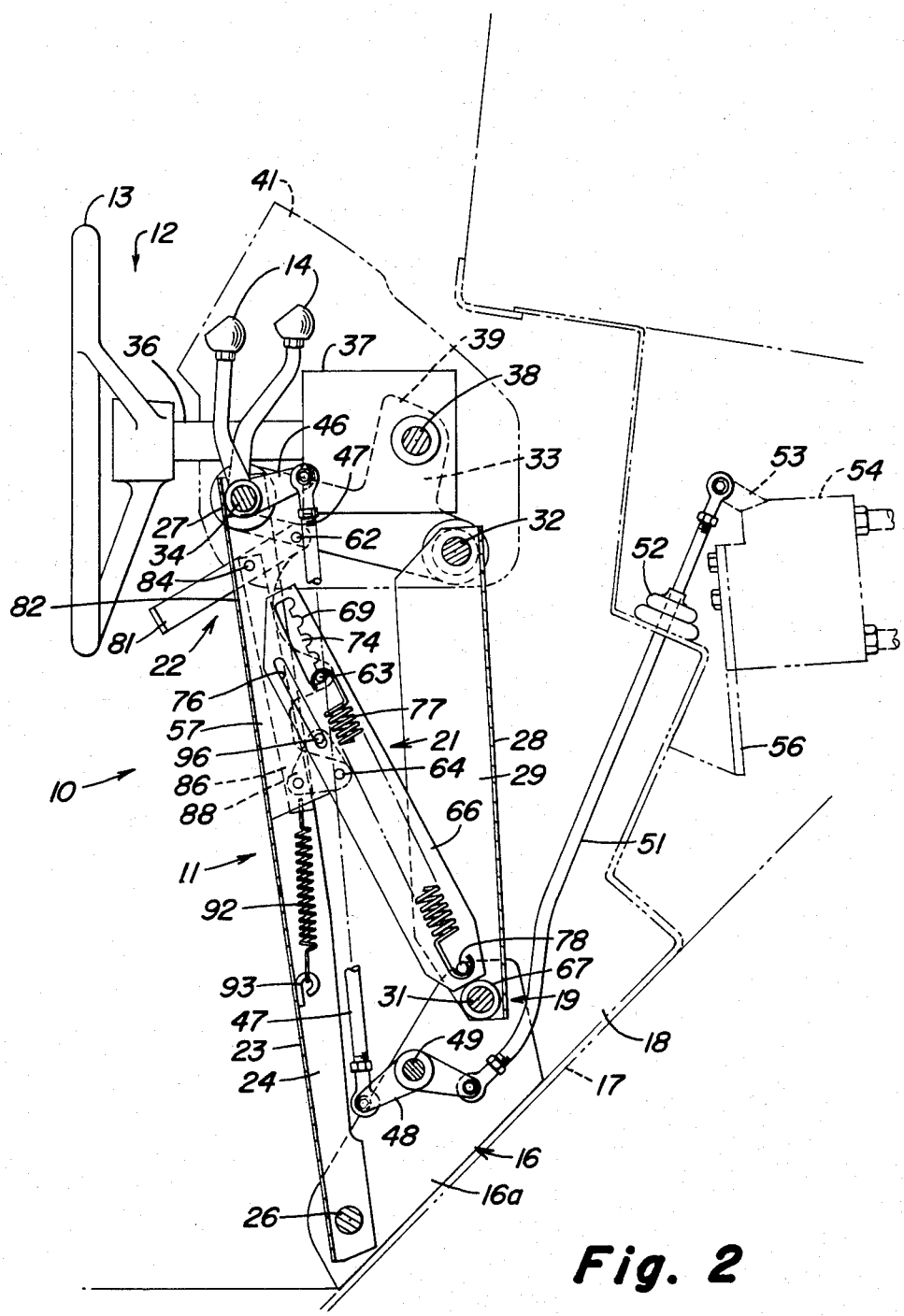
FIG. 2 is a side elevational view of the console, shown partly in section and showing the internal locking and release mechanisms of this invention, the steering wheel unit being shown partially in phantom.

Referring now to the drawings, wherein like reference numerals designate identical or corresponding parts throughout the several views, the steering unit and control lever console of this invention is indicated generally at (10) in FIGS. 1 and 2. The console (10) comprises a pedestal assembly (11) for supporting a vehicle steering unit (12) which includes a steering wheel (13), and one or more of a plurality of control levers (14).

The console (10) comprises further a platform device (16) comprised of a pair of transversely spaced plates (16a) which pivotally mount the pedestal assembly (11) in an upward position, with the platform device (16) being mounted on the front panel (17) of an operator's station or cab (18), for movement about a transverse axis (19) to adjust the position of the pedestal assembly (11). The console comprises further a locking unit (21) (FIGS. 2 and 6) pivotally mounted on the platform device (16) for locking the pedestal assembly (11) against pivotal movement of the pedestal assembly (11) to an adjusted position, FIG. 2 showing the console pedestal assembly (11) in an adjusted position furthest from the operator (not shown) who is either seated or standing, with the pedestal assembly (11) shown in FIG. 3 in an adjusted position moved rearwardly from the adjusted position of FIG. 2, with the FIG. 3 pedestal assembly (11) position being the closest to the operator, whether standing or sitting.

Figure 3:
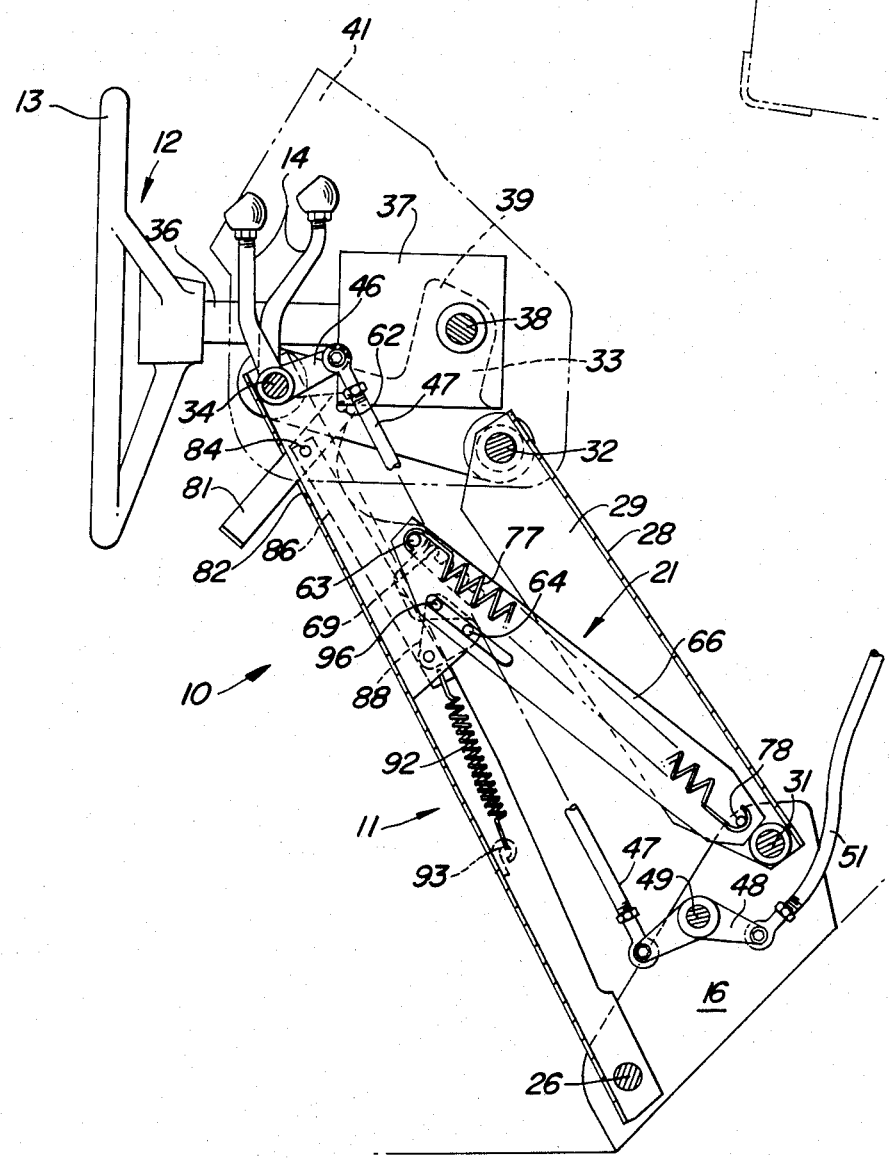
FIG. 3 is a side elevational view of the adjustable console of this invention similar to FIG. 2, but with the console shown moved rearwardly toward the operator's position (not shown)

Lastly, a release unit (22) (FIGS. 2 and 6) is part of the console (10), which release unit (22) disengages the locking unit (21) whereby the pedestal assembly (11) may be pivotally moved by the operator to any one of the adjusted positions between the extreme fore and aft positions of the pedestal assembly (11) as shown in FIGS. 2 and 3, respectively.

The pedestal assembly (11) comprises a U-shaped rear panel (23) (FIGS. 1 and 2) having forwardly extended side flanges (24), which panel (23) is mounted at its base for pivotal movement on a transverse shaft (26) rotatably mounted in the platform device (16). At the upper end of the rear panel (23), a transverse sleeve (27) is inserted between the side flanges (24) for a purpose hereinafter described. A U-shaped front panel (28) is mounted at the front of the pedestal assembly (11) (FIGS. 1 and 2), and includes a pair of rearwardly extended side flanges (29). The base of the front panel (28) is rotatably mounted on a transverse shaft (31), which shaft (31) forms the transverse axis (19), the outer ends of which are rotatably mounted in the platform device (16). The upper end of the front panel (28) has a transverse shaft (32) extended thereto, which shaft (32) mounts the forward end of a pair of transversely spaced T-shaped link plates, the rearward ends of which are pivotally mounted to a transverse shaft (34) inserted through the sleeve (27). By this arrangement of the pedestal assembly (11), a 4-bar, trapezoidal-type linkage is provided whereby the pedestal assembly (11) is pivotally movable as a unit between the positions indicated in FIGS. 2 and 3 to an adjusted position as determined by the operator.

The steering unit (12) includes other than the provision of the link plates (33) for completing the 4-bar parallelogram, the steering wheel column (36) inserted into a conventional hydraulic steering unit (37), the fluid lines not showing, which steering unit (37) is pivotally mounted by a shaft (38) to the upright portion (39) of the link plates (33). By this arrangement, the steering wheel unit (12) is pivotally movable relative to the pedestal assembly (11) and independent of the angle of adjustment of the pedestal assembly (11). Mechanism (not shown) is provided for adjustably locking the steering unit (12) in one of several adjusted positions relative to the pedestal assembly (11). A hood (41) is shown in FIGS. 1 and 2 which encompasses the hydraulic unit (37) and within which is mounted all of the instruments and gauges for the instrument panel (not shown) directly in front of the steering wheel (13).

Although not a part of this invention, the control lever arrangement will be briefly described. Each lever (14) is rotatably mounted on the transverse shaft (34) (FIG. 2) for fore and aft movement, with each lever (14) including an arm (46) rotatably connected to an upright, elongated rod (47) the lower end of which is rotatably connected to one end of a bell crank (48) rockably mounted on a transverse shaft (49) secured across the platform device (16). The other end of the bell crank (48) is rotatably connected to the lower end of an elongated link which extends upwardly and forwardly through a grommet (52) and opening (not shown) provided therefor on the front panel (17) of the cab (18). The upper end of the link is rotatably connected to a lever (53) which is operably engaged with an appropriate hydraulic valve portion (not shown) of a hydraulic valve unit (54) mounted on a panel (56) secured to the front of the cab (18).

Figure 6:
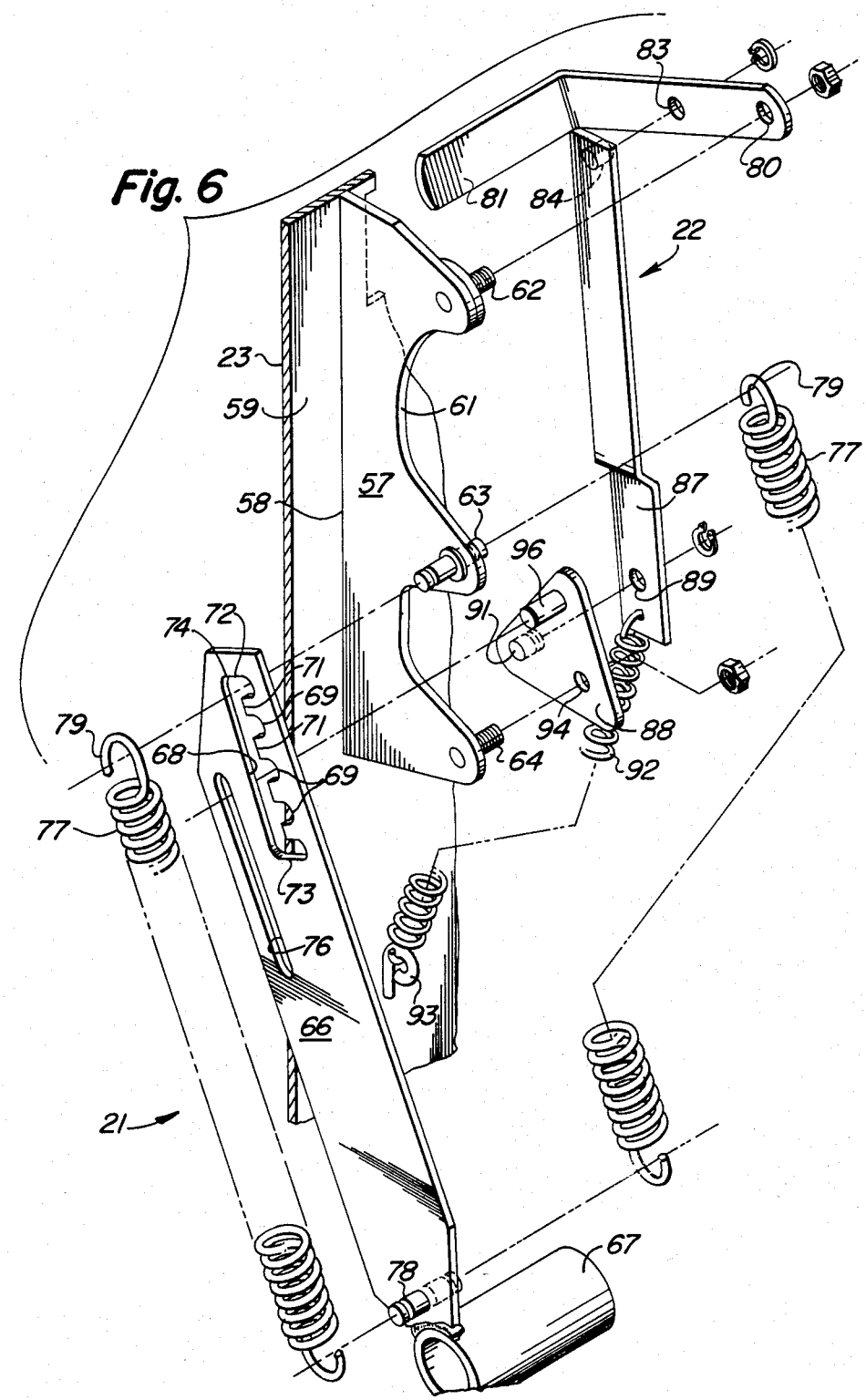
FIG. 6 is an exploded view of the parts illustrated in FIGS. 4 and 5 as shown in perspective.

Referring particularly to FIGS. 4 and 6, the pedestal assembly (11) is completed by the provision of a rear pedestal support locking plate (57) secured along one straight edge (58) to the forward surface (59) of the rear panel (23). The opposite edge (61) of the locking plate (57) has a trio of protruding portions formed therein, the upper of which has a threaded member (62) secured thereto and extended to one side of the plate (57), the middle protrusion having a pin (63) secured therein, which pin (63) is extended outwardly from both sides of the locking plate (57), and the lower protrusion having another threaded member (64) secured thereto similarly located as the threaded member (62). The import of the pedestal assembly locking plate (57) and its components will be seen hereinafter.

A locking unit (21) includes an elongated flat locking bar (66) the lower end of which is secured as by bolting to a sleeve (67) rotatably embracing the transverse shaft (31) (FIG. 2), and the upper end of which has formed therein a notched cut-out (74) extended longtudinally of the locking bar (66), with one side (68) of the cut-out being straight and extended parallel to the length of the bar (66), and with the other side having a series of notches (69) formed therein, each notch (69) being adjacent to a land (71) as clearly shown in FIG. 4. The upper end of the notched cut-out is closed at (72) within the bar (66) and the lower end (73) of the cut-out is closed. Extended parallel to the notched cut-out (74) is an elongated slot (76) the purpose of which will be seen hereinafter, the slot (76) extended parallel to the longitudinal extent of the notched cut-out (74).

The locking unit (21) includes further a pair of counterbalancing springs (77) the lower ends of which are connected to opposite ends of a pin (78) secured to the lower end of the sleeve (67). With each spring (77) being adapted to extend along one side of the locking bar (66), the upper ends (79) of the spring (77) adapted to engage opposite ends of the pin (63) (FIGS. 4 and 6).

The release unit (22) for the console assembly (10) includes a pedestal tilt lock release handle (81) (FIGS. 1, 2 and 4) which is L-shaped, and which extends from interior of the pedestal unit (11) to an exposed position exterior thereof through an opening (82) (FIG. 4) formed in the pedestal panel (23), the release handle (81) disposed below the steering wheel (13) for easy grasping by either hand of the operator. The inner end of the release handle (81) is pivotally connected to the threaded member (62) (FIG. 5) secured to the plate (57). An opening (83) (FIG. 6) is formed within the release handle (81) to receive the stud (84) secured to the upper end of an elongated release link (86). The release link depends parallel to the plate (57) (FIG. 5), except for the lower end (87) thereof which is offset to accommodate a triangular-shaped bell crank (88) (FIG. 5).

The lower end (87) of the release handle (81) has another opening (89) formed therein to receive and be pivotally connected to a stud (91) (FIG. 6) which is secured to one corner of the bell crank (88). A spring (92) is connected at its upper end to the lower end of the release link (86), and the lower end of the spring is secured to a hook (93) (FIG. 2) affixed to the rear of the panel (23). By this arrangement of the spring (92), the release link (86) is normally biased downwardly to pivot the release handle (81) downwardly or in counterclockwise direction as viewed in FIG. 4.

The release unit (22) includes further an opening (94) (FIG. 6) formed in a second corner of the bell crank (88) to receive and pivotally connect the bell crank (88) to the threaded member (64) secured to the plate (57). A stud (86) is secured to the third corner of the bell crank (88) and extends through the slot (76) (FIGS. 4 and 6) formed within the locking bar (66). It will be noted that appropriate spacers, washers, snap rings and the like are illustrated although not numbered, to provide for effective connection and operation of the aforementioned parts.

In operation of the console (10), it is shown in FIG. 2 in its most forward adjusted position, the farthest away from the operator whether standing or seated. In that position of the console, the stud (96) of the bell crank (88) is shown at the lower end of the slot (76) formed in the locking bar (66), and with the pin (63) secured to the locking plate (57) held at the lower end of the notched cut-out (74). By virtue of spring (92) and weight of the bar (66), the locking bar (66) is biased toward the rear and into engagement with the pin (63). The release handle (81) is biased in its normally lower position due also to the spring (92), and with the entire console maintained in its locked position.

To move the console (10) to an adjusted position differently from that illustrated in FIG. 2, to the position, for example, illustrated in FIG. 3 where the console (10) is moved to its most rearward position, or that closest to the operator, the following occurs. The operator grasps and lifts the release handle (81), moving it in a clockwise direction about its pivot (62) as viewed in FIG. 2, thereby raising the release link (86) against the bias of the spring (92). This moves the stud (91) formed on the bell crank (88), thereby moving the bell crank (88) in a clockwise manner about the stationary member (64) secured to the locking plate (57).

As the bell crank (88) is rotated in a clockwise manner as is viewed in FIG. 2, action by the stud (96) forces the locking bar (66) in a clockwise direction about its pivotal connection with the shaft (31), which action in moving the locking bar (66) relative to the pin (63), releases the pin (63), permits the pin (63) to slide along the straight side (68) of the notched cut-out (74) to a position upwardly of the notched cut-out (74) depending upon the amount of counterclockwise rotation of the console (10) about the shafts (26) and (31).

Simultaneously, the stud (96) slides upwardly within the slot (76) a distance equivalent to that traveled by the pin (63). At the rearwardly adjusted position of the console (10) determined by the operator, FIG. 3 for example, a release of the handle (81) causes it to move counterclockwise of the raised position thereof, thus lowering the bell crank stud (91) and pivoting the bell crank (88) in a counterclockwise position about the stationary member (64); this action moving the stud (96) in a counterclockwise manner thereby pivoting the locking bar (66) in a counterclockwise direction, which action causes one of the notches (69) to engage the pin (63) therein. Here again, the biasing actions of the spring (92) and the bar (66) causes the locking unit (21) to remain in its locked condition at this adjusted position of the console (10). The position and weight of the bar (66) acts to lock the pedestal assembly (11) in place should the spring (92) fail.

Referring to FIG. 4, as the diameter of the pin (63) is greater than the width of each notch (69) at a predetermined portion thereof, the pin (63) does not seat completely in a notch (69), but is forced into a "wedge" condition therewith due to the bias of the spring (92) and the weight of the bar (66), such that a firm fit is obtained between the pin (63) and the notched cut-out area (74), thereby obviating any looseness of these parts during the operation of the console and the vehicle of which the console is mounted and made operable therewith.

It is also to be noted that by the provision of the front and rear panels (28) and (23), respectively, and including their flanges (24) and (29), respectively, a box-like housing is formed about the locking unit (21) and the release unit (22) such as to contain and confine all parts thereof, with the exception of the release unit (22), a portion of which extends rearwardly thereof.

We claim:
1. A steering unit and control lever console for a vehicle comprising:
   pedestal means for supporting the vehicle steering unit and at least one vehicle control lever;
   platform means pivotally mounting said pedestal means in an upward position on the vehicle for movement about a transverse axis to adjust the position of said pedestal means;
   locking means pivotally mounted on said platform means for locking said pedestal means against pivotal movement upon movement of said pedestal means to an adjusted position; and
   release means for disengaging said locking means whereby said pedestal means is pivotally movable to an adjustable position,
   handle means pivotally secured to said pedestal means and protruding forwardly therefrom and disposed below the steering unit.
2. The invention of claim 1 and further wherein said pedestal means includes a housing unit containing said locking means at all adjusted positions of said pedestal means, and further wherein said locking means remains confined within said housing unit during adjustment of said pedestal means.
3. The invention of claim 8 and further wherein said locking means including stop means engaged with said bell crank, said bell crank operatively movable when engaged with said stop means to move said locking bar relative to said locking pin, said stop means operable to limit the pivotal movement of said pedestal means.
4. The invention of claim 3 and further wherein said locking means including stop means limiting the pivotal movement of said pedestal means.
5. The invention of claim 2 and further wherein said pedestal means includes a locking pin affixed thereto and wherein said locking means includes a notched locking bar biased normally toward said locking pin, the said notches formed on said locking bar each having a V-type shape adapted to receive and engage said locking pin in a firm, wedge fit.

6. The invention of claim 1 and further wherein said pedestal means includes a locking pin affixed thereto and wherein said locking means includes a notched locking bar biased normally toward said locking pin, the said notches formed on said locking bar each having a V-type shape adapted to receive and engage said locking pin in a firm, wedge fit.

7. The invention of claim 6 and further wherein said notched locking bar is pivotally mounted at its lower end to said platform means, said notches formed in an edge of said locking bar facing in the same direction as the steering unit.

8. The invention of claim 7 and further wherein said means includes a pivotally mounted bell crank biased normally in a position engaging said locking bar and forcing said locking bar into engagement with said locking pin.

9. The invention of claim 8 and further wherein said release means includes a link interconnected between said handle and said bell crank, which link is spring biased toward a position holding said handle in an inoperative position and holding said bell crank in said locking bar-locking pin engagement relationship.

10. The invention of claim 1 and further wherein said pedestal means includes a housing unit containing said locking means at all adjusted positions of said pedestal means, and further wherein said locking means remains confined within said housing unit during adjustment of said pedestal means.

11. The invention of claim 1 and further wherein said release means includes a pivotally mounted bell crank operatively engageable with said locking means for urging said locking means into an adjusted position with said release means.

* * * * *

UNITED STATES PATENT AND TRADEMARK OFFICE
CERTIFICATE OF CORRECTION

PATENT NO. : 4,682,787
DATED : July 28, 1987
INVENTOR(S) : Martin L. Ruhter and Allan F. Loney It is certified that error appears in the above-identified patent and that said Letters Patent are hereby corrected as shown below:

In the specification, page 2, line 42, change "front" to --rear--. Line 57, change "rear" to --front--.

In claim 1, page 6, beginning in line 49, in the phrase "handle means pivotally secured to said pedestal means and protruding forwardly therefrom and disposed below the steering unit", please change the word "forwardly" to --rearwardly--.

Signed and Sealed this

Twenty-second Day of December, 1987

Attest:

DONALD J. QUIGG

Attesting Officer

Commissioner of Patents and Trademarks